United States Patent [19]

Sanzone et al.

[11] 3,890,932
[45] June 24, 1975

[54] COLLAPSIBLE CONTAINER AND LATCHING MEMBER

[76] Inventors: Anthony V. Sanzone, 14513 Homerite Dr., San Jose, Calif. 95124; Antonio C. Sanzone, 349 Richlee Dr., Campbell, Calif. 95008

[22] Filed: Oct. 9, 1973

[21] Appl. No.: 404,212

[52] U.S. Cl. .................................................. 119/19
[51] Int. Cl.² ........................................... A01K 1/02
[58] Field of Search ............... 119/19, 16, 20; 46/19

[56] References Cited
UNITED STATES PATENTS

| | | | |
|---|---|---|---|
| 1,941,662 | 1/1934 | Cunningham | 119/19 |
| 2,680,327 | 6/1954 | Harper | 46/19 |
| 3,043,264 | 7/1962 | Felhofer et al. | 119/19 |
| 3,144,852 | 8/1964 | Messeas | 119/19 |
| 3,791,347 | 2/1974 | Lovell | 119/19 |

*Primary Examiner*—Hugh R. Chamblee

[57] ABSTRACT

A collapsible pet cage is described having a pair of side wall members, a top and bottom wall member, a rear wall member and a screen-receiving front wall member for removably receiving a wire mesh screen or the like. The side wall members are provided with inwardly projecting vertical and horizontal support members extending, respectively, from their vertical and horizontal edges. The top, bottom, rear and front wall members are supported interior of the vertical and horizontal support members. When assembled, the wall members are retained in a box-like, rigid relationship by means of a pair of latching members pivotably coupled to the front and rear edges of the side wall members. No separate bolts, rods, screws or other separable fittings are required. When disassembled, the top, bottom, front and rear wall members fit within an enclosure provided by the side wall members so as to permit use of the side wall members as a shipping container for the various other members.

16 Claims, 5 Drawing Figures

PATENTED JUN 24 1975 3,890,932

SHEET 1

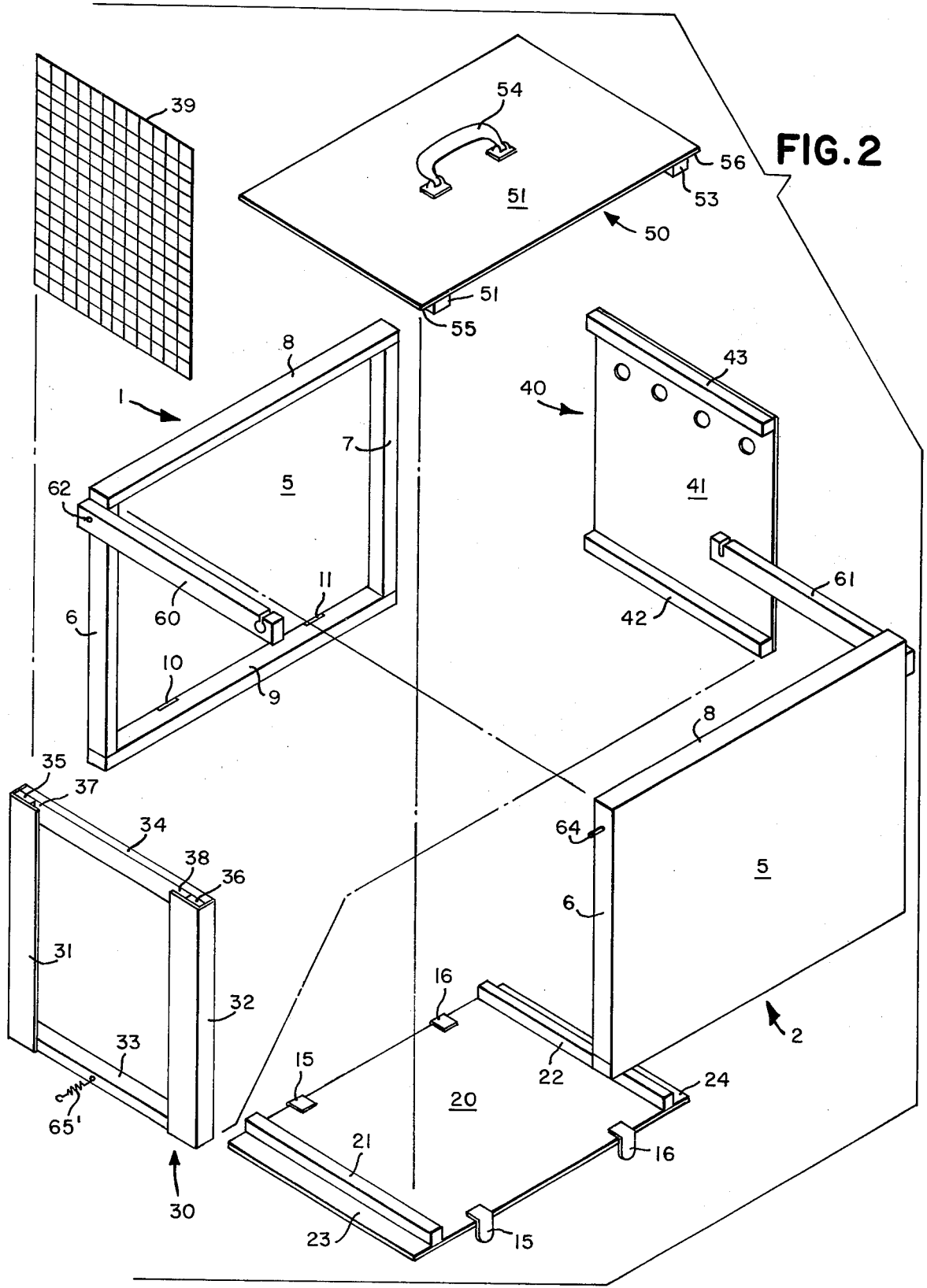

COLLAPSIBLE CONTAINER AND LATCHING MEMBER

BACKGROUND OF THE INVENTION

The present invention is related to collapsible containers in general, and in particular to a collapsible container for the caging and transportation of animals.

Collapsible containers in general and collapsible containers for the caging and transportation of animals in particular come in a variety of forms. Typically, the containers comprise a plurality of wall members and numerous parts including rods, nuts, bolts and various other types of separable fittings which are used in assembling the walls of the container to form a rigid box-like enclosure.

Experience with prior known containers has shown that the use of rods, nuts, bolts and various other types of separable fittings is undesirable because such pieces become easily lost or misplaced, are time-consuming to use, and generally increase undesirably the cost of manufacturing the containers.

Prior known containers are further found to ordinarily require a separate container for carrying the various parts making up the container when the container is in a state of disassembly. In practice, unfortunately, the carrier is frequently left behind when a container is assembled and shipped to a distant point. Such practices lead to the above described loss of parts when the container is later disassembled since no means is generally readily available in which to contain or adequately store the various parts for subsequent use.

SUMMARY OF THE INVENTION

In view of the foregoing, the principal object of the present invention is a novel collapsible container in which the principal means for assembling the container into a rigid, box-like enclosure are permanently affixed to the wall members comprising the enclosure.

The wall members comprise a top, a bottom, a front, a rear and a pair of side wall members. The front and rear wall members are supported and retained between and adjacent opposite edges of the top and bottom wall members. The means for retaining the front and rear wall members, in addition to the side members, comprises a plurality of lateral support members which are fixed to the top and bottom wall members interior of opposing edges of the front and rear wall members. The bottom wall member is further provided with clips which are removably received in slots provided therefor in the side wall members.

Extending inwardly from the peripheral edges of the side wall members are a plurality of side wall edge members. The edge members receive the top, bottom, front and rear wall members and, together with the lateral support members fixed to the top and bottom members as previously described, retain and prevent the inward and outward movement of the front and rear wall members. Inward and outward movement of the top and bottom wall members is prevented by the edge members and the intermediately positioned front and rear wall members.

Attached to the exterior of the side wall members there is provided a plurality of elongated latching members. Each latching member is provided with two ends. One end of the latching member is pivotably connected to one of the side wall members. The other end of the latching member comprises means for providing a releasable coupling to the other of the side wall members. The means provided for the latter end is a stud-receiving slot and bore. The slot serves to receive a stud mount in the latter described side wall member and the bore, which communicates with the slot, serves to receive a retaining member provided on the stud. The slot is provided in an upper portion of the latching member, thereby providing a means by which the container may be lifted by means of the latching members without the possibility that the latching members will decouple from the side wall members.

DESCRIPTION OF THE DRAWING

Having summarized a preferred embodiment of the present invention, it is understood that other objects, features and advantages of the present invention will be apparent from the following detailed description of the accompanying drawings in which:

FIG. 2 is an exploded view of the cage of FIG. 1.

DETAILED DESCRIPTION

Figure 1:
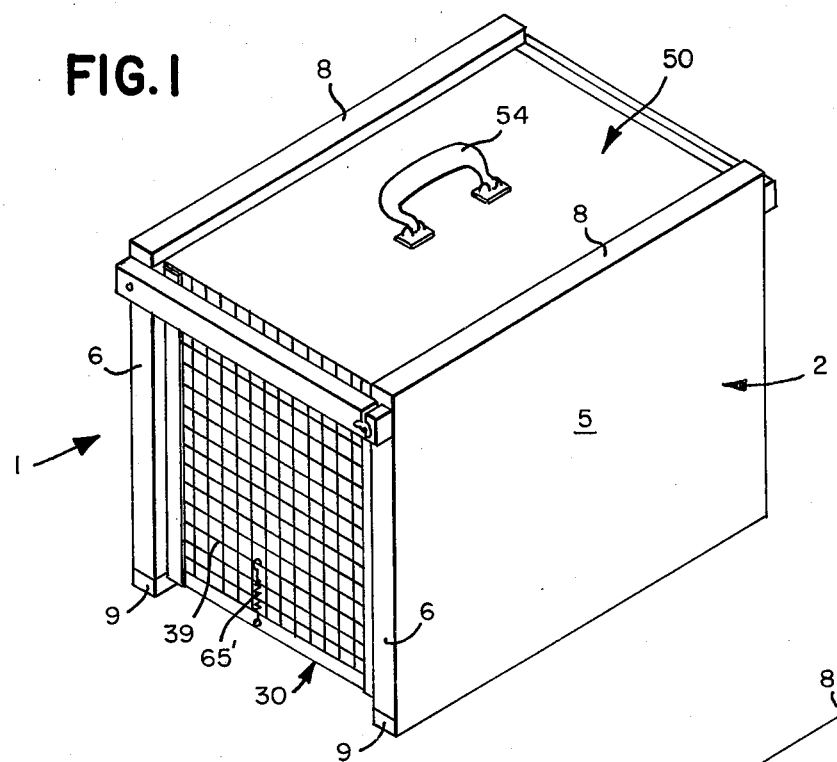
FIG. 1 is a perspective view of a pet cage in accordance with the present invention.

Referring to the accompanying drawings, there are provided two side wall members 1 and 2. Each side wall member comprises a main wall portion 5 framed by two vertical supports 6 and 7 and two horizontal supports 8 and 9. A pair of slots 10 and 11 are provided in the lower one of the horizontal supports 8 and 9 for receiving a pair of retaining clips 15 and 16, respectively, fixedly mounted to a floor or bottom member 20. Floor member 20 is further provided with a pair of horizontal support members 21 and 22 which provide vertical support for floor member 20 as well as serving as an interior stop or buttress for the lower end of a front member 30 and a back member 40. Front member 30 comprises a pair of vertical support members 31 and 32 and a pair of horizontal support members 33 and 34. Vertical members 31 and 32 each comprise an intermediate member 35 and 36 of reduced transverse cross section for providing a pair of slots 37 and 38 for receiving a screen of wire mesh 39.

When installed, front member 30 is supported on a margin 23 outwardly of horizontal support member 21 of floor member 20 and interior of vertical support members 6 of side members 5.

Back member 40 comprises a wall 41 provided along its top and bottom edges with a pair of horizontal support members 42 and 43.

When installed, back member 40 is supported on a margin 24 outwardly of horizontal support member 22 of floor member 20 and interior of vertical support members 7 of side members 1 and 2.

The cage of the present invention is further provided with a top member 50. Top member 50 is provided with a wall 51 and a pair of horizontal support members 52 and 53 which provide vertical support for wall 51. Member 50 is further provided with a carrying handle 54 for carrying the cage when assembled.

When installed, support members 52 and 53 of top member 51 serve as an interior stop or buttress for the top ends of front and back members 30 and 40, respectively, in that the top of members 30 and 40 are fitted in a pair of margins 55 and 56 provided outwardly of support members 52 and 53. Vertical support for top member 51 is further provided by horizontal support members 8 of side members 1 and 2 in that, when installed, the longitudinal edges of wall 51 extend beneath members 8.

A very important feature of the present invention is the manner in which the above described component parts of the cage are secured when assembled.

Figure 3:
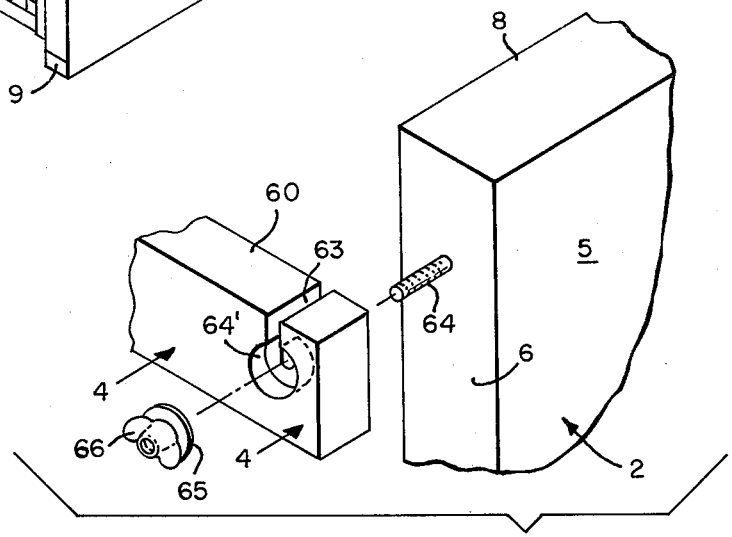
FIG. 3 is an enlarged perspective view of one end of a latching member in accordance with the present invention.
Figure 5:
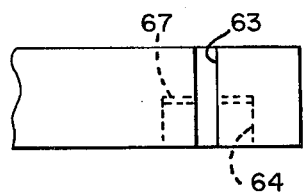
FIG. 5 is a plan view of the latching member of FIG. 4.
Figure 4:
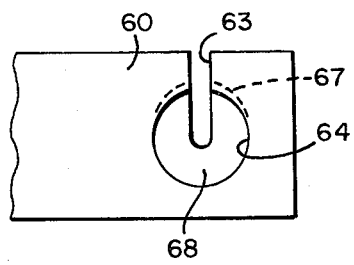
FIG. 4 is an elevation view of the latching member of FIG. 3.

For the purpose of securing the parts, there is provided a pair of elongated cross or latching members 60 and 61 which are pivotably mounted near the upper end of vertical supports 6 and 7 of side members 1 and 2 as by a rivet 62. Referring to FIGS. 3–5, each of the ends of cross members 60 and 61 opposite rivet 62 is provided with a slot 63 for receiving a threaded stud 64 fixedly mounted in vertical support member 6 of side members 1 and 2. Slot 63 communicates with a bore or cavity 64' provided for receiving a washer or radially extending flange 65 or a wing nut 66. Cavity 64', which has an inner wall 68, serves, in cooperation with flange 65 and nut 66, to prevent decoupling of cross member 60 from stud 64 in the event nut 65 should loosen as by vibration during air shipment or the like. As a further precaution against inadvertent decoupling of member 60, a recess 67 is provided at the interior wall 68 of cavity 64' for receiving the top edge of flange 65. Since the outward deflection of member 60 is restricted by rivet 62, the flange alone will tend to support member 60 until it is raised to permit the flange to clear the recess. To avoid a loss of the nut and flange 66 and 65, the end of stud 64 is peened over.

Of considerable importance is the orientation of the slot 63 which is chosen to provide support for cross-members 60 and 61 when the latter are used to carry the cage with or without the use of handle 54. Thus it will be appreciated that the weight of the cage would in that case be borne by the stud 64 in the bottom of slot 63.

In assembly, bottom member 20 is inserted in slots 10 and 11 of side members 1 and 2. While side members 1 and 2 are canted slightly outwardly, front and back members 30 and 40 and top member 50 are put in place. Cross members 60 and 61 are then pivoted into position and secured to stud 64. Lastly, screen 39 is put in place and secured as by a hasp 65 attached 65' attached to horizontal support member 33 of front member 30.

When in a state of disassembly, the top, bottom, front and rear wall member 50, 20, 30 and 40, respectively are fitted in the volume provided by the side wall members 1 and 2, which may be held together by any suitable means in any conventional manner.

While described in terms of a novel, collapsible container wherein all parts required for assembly are permanently affixed to the principal wall members, it is understood that latching members 60 and 61 may be pivotably fitted to the side walls as by a conventional nut and bolt and that stud 64 or the like need not be peened over. It is further understood that, while wood supports and wall members may be used, other materials may be used also, such as plastics and metal, and that somewhat other means of constructing the latching members may be used. For example, a shallow portion of the exterior of the latching member in the vicinity of the slot 63 may be removed for providing clearance for nut and flange members 66 and 65, thereby permitting a shortening of the stud 64. By way of another example, as when a metal latching member is used, the metal latching member may be provided with a slotted cup-shaped member for receiving the flanged portion of the nut and flange retaining members 66 and 65, which is the substantial equivalent of the bore and recess described.

A preferred embodiment of the invention, together with a modification having been described, it is understood that other modifications may be made without departing from the spirit and scope of the invention as hereinafter defined in the claims.

What is claimed is:

1. A collapsible container comprising:
   a top and bottom wall member;
   a front and rear wall member;
   a first and a second side wall member;
   an elongated member, said elongated member having a first and a second end;
   means for pivotably connecting said first end of said elongated member to said first side wall member; and
   means for releasably coupling said second end of said elongated member to said second side wall member wherein said coupling means includes:
   an elongated stud, said stud being fixed to and having a portion projecting from said second side wall member;
   a retaining member movably attached to said projecting portion of said stud;
   a stud receiving slot adjacent said second end of said elongated member for receiving said projecting portion of said stud; and
   means adjacent said slot for receiving said retaining member and further wherein said retaining member and said retaining member receiving means adjacent said slot include means which cooperate for minimizing inadvertent decoupling of said second side wall member.

2. A container according to claim 1 wherein said means for minimizing inadvertent decoupling of said elongated member and said second side wall member comprises a bore hole in said elongated member in communication with said slot, said bore hole having an inner wall normal to its longitudinal axis; and, further, wherein said retaining member is received in said bore hole and includes means for engaging said inner wall.

3. A container according to claim 2 wherein said stud is threaded, said retaining member is a nut permanently threaded on said stud and, further, wherein said inner wall engaging means comprises a flange extending radially from said nut.

4. A container according to claim 3 wherein said means for minimizing inadvertent decoupling of said elongated member from said second side wall member further comprises a recess provided in a side wall of said bore, said side wall being normal to said inner wall and said recess being provided adjacent said inner wall for receiving said radially extending flange.

5. A container according to claim 1 wherein said stud receiving slot comprises a lower bottom surface on which said stud bears when said elongated member is used to lift said container.

6. A collapsible container comprising:

a top and bottom wall member;
a front and rear wall member;
a first and a second side wall member;
an elongated member, said elongated member having a first and a second end;
means for pivotably connecting said first end of said elongated member to said first side wall member; and
means for releasably coupling said second end of said elongated member to said second side wall member wherein said first and said second side wall members comprise a main wall portion; and
a top, a bottom, a front and a rear side edge member which extends normal to said main wall portion, said edge members each having an interior surface; and further comprising a means for removably retaining said top, said bottom, said front and said rear wall members in flush relationship with said interior surface of corresponding ones of said side edge members.

7. A container according to claim 6 wherein said retaining means comprises:
a means for removably attaching said bottom wall member to said first and said second side wall members; and
a means for supporting said front and said rear wall members between and normal to said first and said second side wall members and said top and said bottom wall members, said supporting means including means for preventing an inward movement of said front and said rear wall members.

8. A container according to claim 6 wherein said means for removably attaching said bottom wall member to said first and said second side wall members comprises:
clip means fixedly mounted on opposing edges of said bottom wall member; and
clip-receiving slots provided in corresponding locations in each of said side wall members for receiving said clip means and, further, wherein said means for preventing inward movement of said front and said rear wall members comprises means projecting normal to said top and said bottom members and disposed inwardly of, and parallel to, opposing edges of said front and said rear wall members.

9. A container according to claim 6 wherein said clip means comprises a plurality of L-shaped fittings, said fittings having a portion extending normal to said bottom wall member for removable insertion in said clip-receiving slots and, further, wherein said means projecting normal to said top and said bottom members for preventing inward movement of said front and said rear wall members comprises an elongated member fixedly attached to and disposed inwardly of opposing edges of said top and said bottom wall members so as to define a marginal edge portion of said top and said bottom wall members for receiving said front and said rear wall members.

10. A container according to claim 9 wherein said front wall member comprises:
a screen member;
means for removably receiving said screen member, said screen member serving to provide ventilation to the interior of said container; and
means for releasably retaining said screen member in said screen member receiving means.

11. A container according to claim 10 further comprising a second elongated member, said second elongated member having a first and a second end; means for pivotably connecting said first end of said second elongated member to at least one of said first and said second side wall members; and means for releasably coupling said second end of said second elongated member to the other one of said first and said second side wall members, said first and said second elongated members cooperating with said means for removably attaching said bottom wall member to said first and said second side wall members and said means for supporting said front and said rear wall members between and normal to said first and said second side wall members and said top and said bottom wall members for maintaining each of said wall members in a predetermined spaced relationship.

12. A container according to claim 6 wherein said first and said second side wall members are sized for receiving and enclosing said top, said bottom, said front and said rear wall members when said container is disassembled.

13. For use in releasably coupling a first member to a second member spaced from said first member, a coupling member comprising:
an elongated member, said elongated member having a first and a second end;
means for pivotably connecting said first end of said elongated member to said first member;
means for releasably coupling said second end of said elongated member to said second member;
an elongated stud, said stud being fixed to and having a portion projecting from said second member;
a retaining member movably attached to said projecting portion of said stud;
a stud-receiving slot adjacent said second end of said elongated member for receiving said projecting portion of said stud; and
means adjacent said slot for receiving said retaining member wherein said retaining member and said retaining member receiving means adjacent said slot include means which cooperate for minimizing inadvertent decoupling of said elongated member and said second member and further wherein said means for minimizing inadvertent decoupling of said elongated member and said second member comprises a bore hole in said elongated member in communication with said slot, said bore hole having an inner wall normal to its longitudinal axis; and further, wherein said retaining member is received in said bore hole and includes means for engaging said inner wall.

14. A coupling member according to claim 13 wherein said stud is threaded, said retaining member is a nut permanently threaded on said stud and, further, wherein said inner wall engaging means comprises a flange extending radially from said nut.

15. A coupling member according to claim 14 wherein said means for minimizing inadvertent decoupling of said elongated member from said second member further comprises a recess provided in a side wall of said bore, said side wall being normal to said inner wall and said recess being provided adjacent said inner wall for receiving said radially extending flange.

16. A coupling member according to claim 13 wherein said stud-receiving slot comprises a lower bottom surface against which said stud bears when said elongated member is used for lifting said first and said second members.

* * * * *